United States Patent [19]

Scharfe, Jr.

[11] 4,243,836
[45] Jan. 6, 1981

[54] DIGITAL AUTOSTART CIRCUIT

[76] Inventor: James A. Scharfe, Jr., P.O. Box 338, South Pasadena, Calif. 91030

[21] Appl. No.: 67,169

[22] Filed: Aug. 16, 1979

Related U.S. Application Data

[63] Continuation of Ser. No. 962,762, Nov. 21, 1978, abandoned.

[51] Int. Cl.³ .................... H04L 7/10; H04M 11/00
[52] U.S. Cl. .................................... 178/4.1 R; 178/3
[58] Field of Search .............. 178/3, 2 R, 2 C, 2 D, 178/2 E, 2 F, 53.1 R, 53 A, 23, 69 G, 4.1 R; 325/320; 358/263, 267, 268; 370/48

[56] References Cited

U.S. PATENT DOCUMENTS

| | | | |
|---|---|---|---|
| 2,873,315 | 2/1959 | Fricks | 358/268 |
| 3,601,539 | 8/1971 | DaSilva | 178/4.1 R |
| 3,798,549 | 3/1974 | Ollinger et al. | 178/4.1 R |
| 3,818,134 | 6/1974 | Firman | 178/53.1 R |
| 4,013,965 | 3/1977 | Scharfe, Jr. | 325/320 |
| 4,054,745 | 10/1977 | Norman | 178/4.1 R |
| 4,069,396 | 1/1978 | Vollnhals et al. | 178/69 G |

Primary Examiner—Thomas A. Robinson
Attorney, Agent, or Firm—Harold E. Gillmann

[57] ABSTRACT

A terminal unit having a digital autostart circuit for energizing an output device such as a teleprinter. The autostart circuit responds only to the space character which is transmitted between every word in the commonly used Murray and ASCII codes. A method for detecting the presence of information signals encoded in the Murray and ASCII codes wherein a predetermined bit of each incoming signal is inverted and the binary states of each bit of incoming character are sensed to determine the presence of the space character.

44 Claims, 3 Drawing Figures

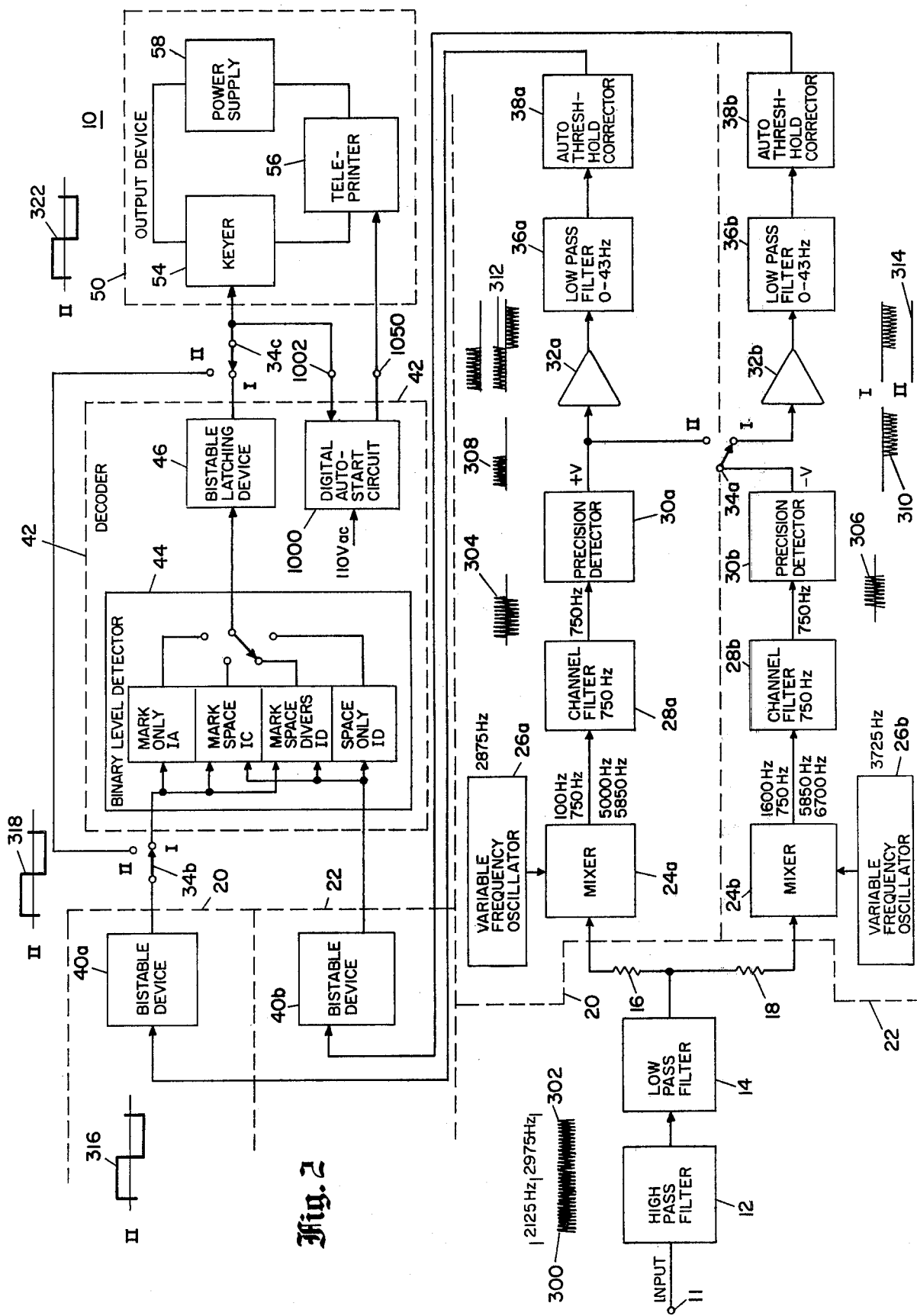

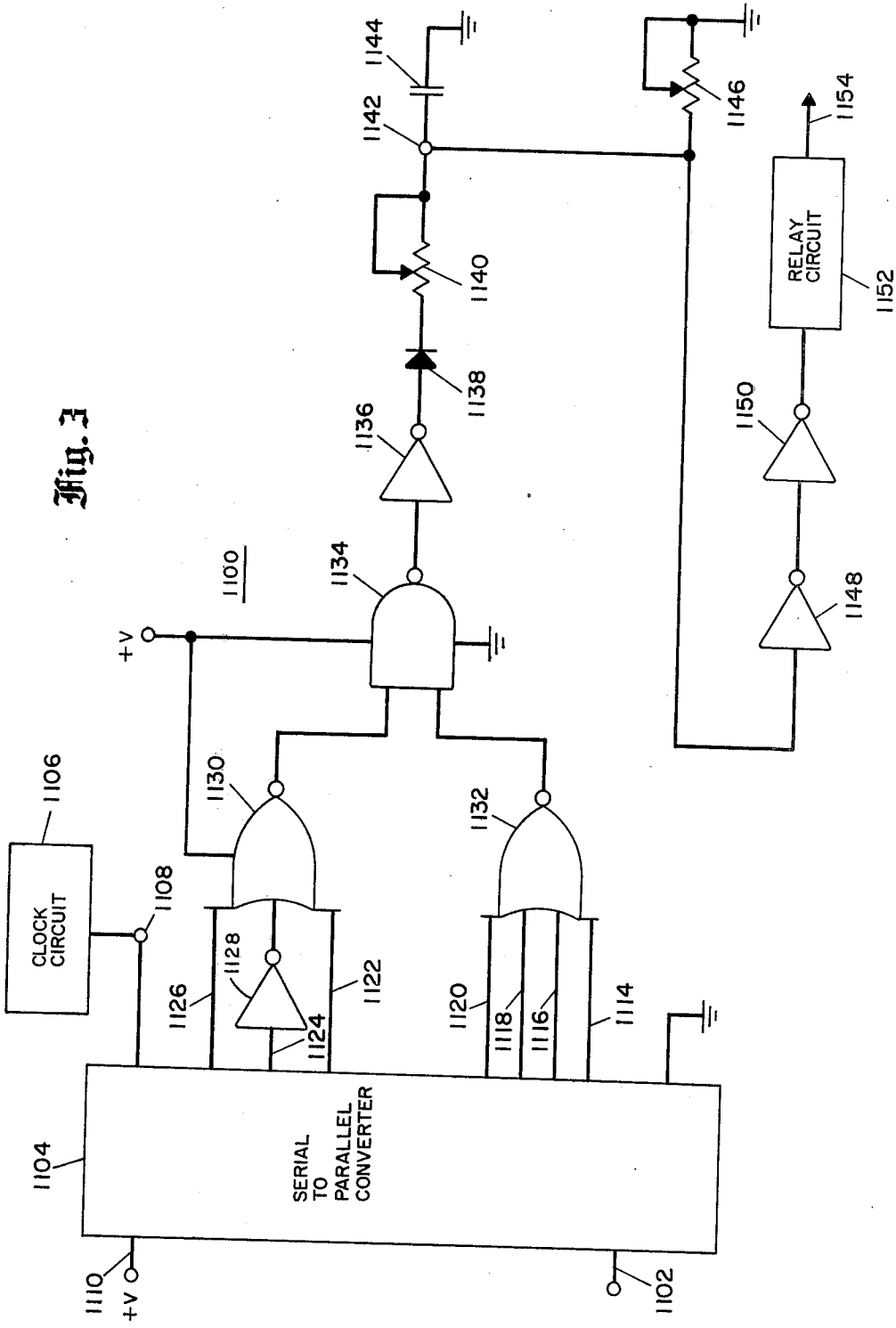

DIGITAL AUTOSTART CIRCUIT

This Application is a continuation of Ser. No. 962,762, entitled 'Digital Autostart RTTY Terminal Unit', filed Nov. 21, 1978 and now abandoned.

BACKGROUND OF THE INVENTION

Terminal units of the prior art utilize an analog form of autostart circuit that is known as mark autostart. Terminal units convert RTTY mark and space tones transmitted via radio to digital pulse which are useful for driving an output device such as the teleprinter. Output devices such as teleprinters and cathode ray terminals respond to information which is digitally coded usually in a commonly known code such as the Murray or ASCII code. Each letter and figure and other character has a start and a stop pulse with a unique combination of binary coded pulses between the start and stop pulses. In the Murray code five bits are used to uniquely define each letter and figure and in the ASCII, seven bits, the eighth being a parity bit. In transmitting these coded signals via radio the highs and lows of the binary bits of each character are converted to mark and space tones which differ by a predetermined frequency. The terminal unit conventionally has a separate mark and space channel which reconverts tones of a particular frequency back into pulses. An autostart circuit is a circuit for automatically energizing an output device so long as an input signal to the circuit is present.

In the prior art the energy signals in the mark channel of the terminal unit rather than the space channel are utilized as an autostart signal according to the convention commonly in use in transmitting radio teleprinter codes. When no information is being transmitted, it is conventional to transmit a mark rather than a space signal. Mark autostart is characterized by its response to any amplitude energy received in the filter of the mark channel of the terminal unit. Because it responds to any amplitude energy, it is susceptible to false starts caused by single sideband signals, CW (Morse Code) signals, noise crashes, static and radio frequency carrier signals which are varied in frequency through the frequency in which the mark signal is received. A mark autostart circuit does not respond to energy in the space channel of a terminal unit. Nor is there any detection of information characters encoded in a radio teleprinter code to differentiate such characters from other signals received at any speed or substantially at a predetermined speed.

In the prior art there are circuits which respond to particular combinations of letters and figures which are known as Selcal circuits for selective calling a particular radio station identified by a unique call sign. Such Selcal circuits are complicated by the lack of exact logic needed to implement them and have no general application for the purpose of energizing an output device whenever an incoming signal is present whether or not an individual station is called.

SUMMARY OF THE INVENTION

The novel terminal unit of the invention overcomes the disadvantages of the prior art by providing a digital autostart logic circuit that detects one predetermined character in a set of encoded characters. According to the invention, the Space character of codes commonly used for the transmission of information is detected by a logic circuit.

The Space character (i.e., space between words) is encoded in the Murray and ASCII codes. The Murray code is more particularly defined as the Communications and Weather Code CCITT No. 2 (Committe Consultatif International Telegraphique et Telephonique) including the American version and is frequently but mistakenly referred to as the Baudot code. Such codes are commonly utilized codes for transmitting information from a transmitter at one point on the earth's surface via radio propagation or land lines, to a teleprinter or other printout device at another point on the earth's surface. The Space character is utilized because of its unique properties. In both of these codes the bits of the Space character are of the same binary state with the exception of one bit. More importantly, the Space character is transmitted once for every word of information conveyed. Thus an autostart circuit will respond only to a predetermined Space character and will lose one word of information at most. A simple first in-first out memory (FIFO) could be used to prevent the loss of even one word of information.

The logic circuit generates a first output signal in response to each detection of the Space character in a plurality of digital information characters each having the same number of bits disclosed in either of these codes but different predetermined binary states. In the disclosed embodiment the means for logically producing the first output signal comprises at least one inverter, at least one NOR gate, and at least one NAND gate but many other combinations of circuit elements may be used to implement this function. The inverter inverts that one bit of the total number of bits comprising each character in the plurality of information characters which is a logic high. The NOR gate receives the inverted bit from the inverter and all the noninverted bits and bit generates an output signal only when all the input bits have the same binary state. The NAND gate receives output signals from one or more NOR gates and produces a first output signal only when the Space character is received by the logic detecting means.

The disclosed embodiment includes means for generating a second output signal in response to the detection of a plurality of Space characters which are interspersed in time by other characters (i.e., letters and figures), in the set of information characters. In its simplest form the means generating the second output signal is a resistor-capacitor network which charges the capacitor in response to multiple first output signals from the NAND gate.

The invention also includes means for detecting a Space character at a particular speed of transmission. A universal asynchronous receiver transmitter (UAR/T) is utlized to convert information characters in serial form to parallel form. The UAR/T is clocked substantially at a preselected baud rate. Information characters are received at preselected speed transmission (baud rate), are sampled at or near the middle of the bit and are converted to parallel form and detected in the manner described above. The baud is the shortest single signal unit in a signalling code and may be expressed as the reciprocal of the time of the shortest signal element, i.e., one bit of one letter or figure. At least one bit of all bits in each character received will be inverted but only the bits of the Space character will simultaneously have the same binary state. If the Space character is received at a baud rate other than the preselected baud rate, inversion of at least one bit of the parallel bits of incoming information characters will not produce simultaneous signals all having the same predetermined binary states, not even when a Space character is received at other than the selected speed. For example, if a Space character is received at a speed sufficiently slower or greater than the speed at which the UAR/T is clocked, the middle bit which is a high logic level will not be sampled by the UAR/T. Rather, one of the other bits will be sampled improperly inverted. Thus, a Space character received at other than the clocked speed will not produce simultaneous signals all having the same predetermined low binary states.

Another aspect of the inventon is a method for detecting a Space character in a plurality of different digitally encoded information characters, i.e., letters and figures where each character has the same number of bits. The Space character is detected by inverting the one bit that is a logic high and sensing when the one inverted bit and the non-inverted bits all have the same binary state. Logic signals all having the same binary state are produced only in response to reception of a Space character. Generating a first output signal only in response to the condition when the logic signals all have the same binary state thus indicates the reception and detection of a Space character.

The novel method further includes the additional and subsequent step of generating a second output signal in response to the detection of a plurality of Space characters interspersed in time between other characters of the set of information characters. For example, the second output signal is generated only after reception of two or three space signals which are separated by words of text each comprising a group of information characters.

The novel method also includes an alternative step of generating a first output signal in response to a Space character received substantially at a predetermined baud rate.

The preferred method includes the additional steps of converting a plurality of the coded digital information characters in the form of audio tones to digital pulses, wherein each of the information characters have the same number of bits but different predetermined binary states defining an individual letter or figure; storing the bits of each received character in a memory device; releasing the bits each said stored character from the memory device; inverting one predetermined bit of each information character to produce logic signals equal in number to the number of bits of each character; sensing when all the logic signals have the same binary state; generating a first output signal only in response to logic signals all having the same binary state which indicates detection of the Space character; and energizing an output device such as a teleprinter in response to the first output signal. The method also includes the additional subsequent step of deenergizing the output device after each first output signal which energizes the output device. Because the Space character is used to frequently (between every word) the output device will stay energized until the information is displayed and the string of information characters comprising a message is concluded.

Because the method of operation of the novel terminal unit detects only the Space character, it does not respond to amplitude energy caused by other types of signals and noise, etc. Also the Space character may be decoded by either the mark or the space channel in the terminal unit since the energy in the two channels normally contains redundant information. If one or the other of the mark or space signals is not received, the novel terminal unit will respond to a Space character decoded by the operative channel. The novel terminal unit will not energize an output device even if the incoming information characters are "upside down". If the polarity of the information from the mark and space channels of the terminal unit is reversed, the digital autostart circuit will sense the character "Figures Shift" as a Space character. The output device will not be energized because the digital autostart circuit is normally adjusted to respond to a plurality of Space characters and only one Figures Shift character is normally transmitted prior to the transmission of the plurality of figures characters, i.e., numbers.

It is, therefore, an object of the invention to provide a terminal unit with the digital autostart circuit for energizing a readout device in response to one predetermined information character which is frequently utilized among a set of such characters for signalling information.

It is also an object of the invention to provide a terminal unit with a digital autostart circuit for energizing an output device such as a teleprinter or a cathode ray terminal which responds to the Space character in a set of information characters encoded in the Murray or ASCII codes for signalling information from point to point on the earth.

It is a further object ot the invention to provide a digital autostart circuit for energizing a device for converting digitally encoded information characters to human readable form, such as a teleprinter or cathode ray terminal, which responds only to the Space character encoded in a commonly used information signalling code as the Murray and ASCII codes.

It is another object of the invention to provide a method for detecting the presence of digitally encoded information characters and energizing a readout device.

It is yet another object of the invention to provide a method for detecting the presence of information characters and energizing a readout device so long as the presence of such characters continues.

It is still a further object of the invention to provide a method for detecting the presence of information characters and for energizing a readout device only in response to the reception of the Space character encoded in a commonly known signalling code.

It is a particular object of the invention to provide a method for detecting the presence of information characters and for energizing a readout device by sensing the reception of a Space character encoded in a commonly known code for signalling information and transmitted substantially at a predetermined speed.

BRIEF DESCRIPTION OF THE DRAWINGS

FIG. 2 is a block diagram of a terminal unit including the digital autostart circuit of FIG. 1 for energizing a teleprinter.

FIG. 3 is a digital autostart circuit which detects Space characters encoded in the ASCII code.

DESCRIPTION OF THE PREFERRED EMBODIMENT

Figure 1:
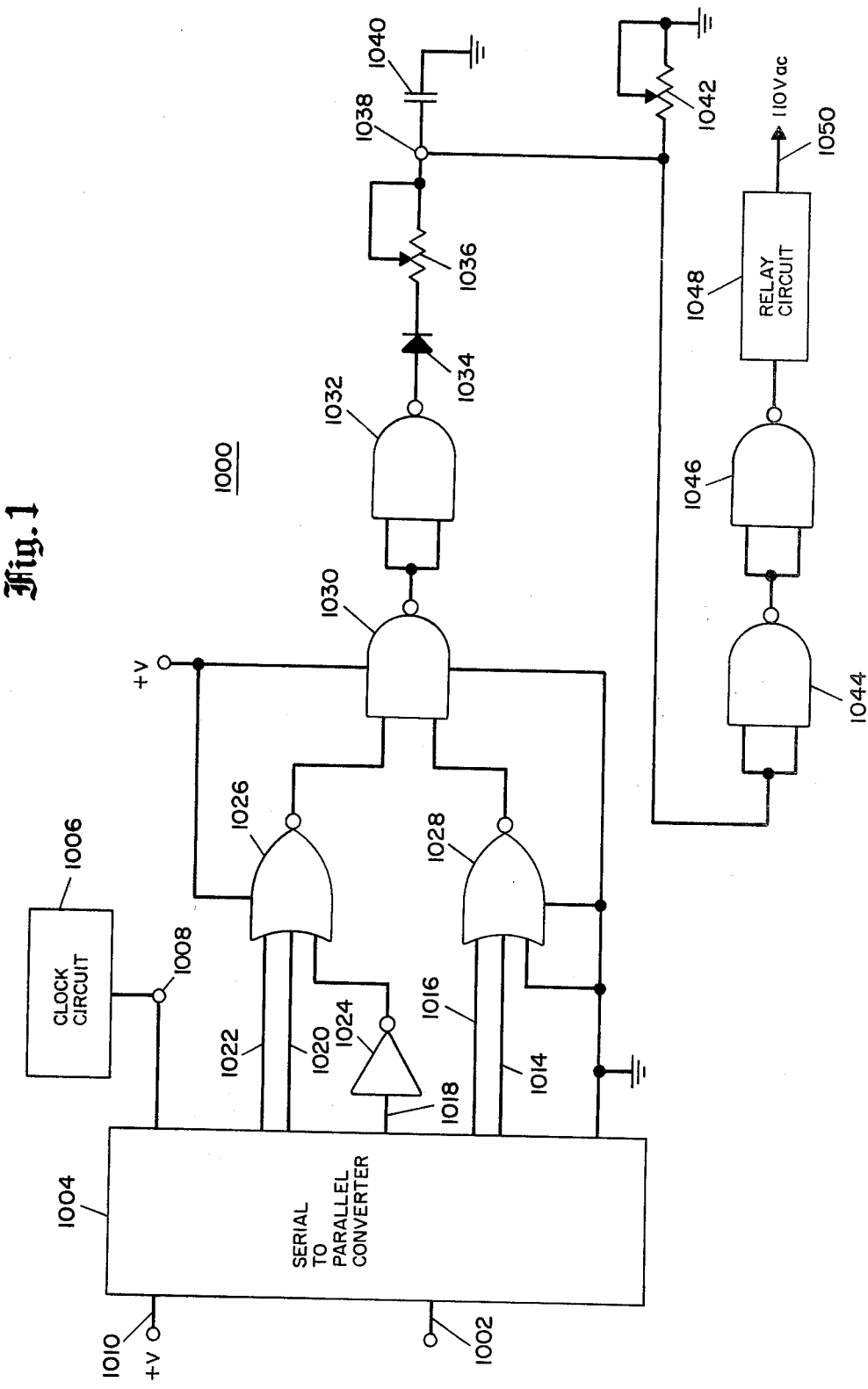
FIG. 1 is a schematic diagram of the digital autostart circuit which responds to Space characters in the Murray code.

FIG. 1 shows a digital autostart circuit 1000. Encoded information characters in serial form are received at input port 1002 of a serial to parallel converter which may be, for example, a universal asynchronous receiver transmitter (UAR/T) 1004. Each information character received by the UAR/T is characterized in that each character in the set has the same number of bits but it is defined by a combination of different binary states. Digital autostart circuit 1000 is intended to be utilized for energizing a teleprinter upon the reception of information characters encoded in the Murray code. In this code at 50 baud each character comprises a start pulse, 5 bits of information each of substantially 20 milliseconds in duration, and a stop pulse. In this application UAR/T 1004 is utilized to convert the serial information character received at input port 1002 into parallel form. UAR/T 1004 may be, as for example, an Intersil IM 6402 integrated circuit programmed by the user for five bit operation. However, any serial to parallel converter may be utilized, for another example, an asynchronous shift register.

UAR/T 1004 is clocked by a clock circuit 1006 which may be a well known crystal oscillator with a selectable divider circuit for selection of specific baud rates. Clock circuit 1006 generates the required pulses for operating UAR/T 1004 at 45.45, 50.0, 56.88, 74.2 and 75.0 baud (corresponding to 60, 66, 75, 100 and 106 words per minute, respectively) in the preferred embodiment. The output of the clock circuit 1006 is applied to the UAR/T at input port 1008. The UAR/T is powered by application of a positive voltage to port 1010.

The five information carrying bits of each character are present at output ports 1014, 1016, 1018, 1020 and 1022 each time UAR/T 1004 converts a character from serial to parallel.

The information bit at output port 1018 of UAR/T 1004 is inverted by inverter 1024. Digital autostart circuit 1000 responds to the Space character in the Murray code. In this code the Space character is uniquely defined with respect to alphanumeric and other characters in the code by five bits of information, space, space, mark, space, space. In binary notation signals are 00100 at output ports 1014-1022, respectively. Inverter 1024 inverts the middle bit so that signals present at the output ports 1014 and 1016 of UAR/T 1004, at the output port of inverter 1024, and at the output ports 1020 and 1022 of UAR/T 1004 are 00000, respectively. These 00000 signals are received by NOR gates 1026 and 1028 only when the Space character in the Murray code is detected. Any other information character in this code which is detected by UAR/T 1004 would not present signals all having the same predetermined low binary state to the input ports of NOR gates 1026 and 1028. For example, the letter "A" in the Murray code is defined as a mark, mark, space, space, space which in binary terms is 11000. Inversion of the middle bit results in signals with binary states 11100 each time the letter "A" is received. Inverting the middle bit of five characters presents signals at the input ports of NOR gates 1026 and 1028 having binary states 00000 only when the Space character is properly received.

Although two NOR gates are shown in FIG. 1 the NOR gates may be of any configuration such as a single device having six inputs or, for example, may be a pair of NOR gates. The total number of input ports must, of course, be equal to or greater than the number of bits comprising each information character in the code.

NOR gates 1026 and 1028 and inverter 1024 may be a RCA CD 4000 integrated circuit device, for example.

NOR gates 1026 and 1028 each operate according to the following logic. Each gate input will recognize a certain range of voltage as the logical low and another higher range of voltage as the logical high. When the input signals to a NOR gate are all low, the output voltage will be high. As shown in FIG. 1, the NOR gates are powered with a positive voltage and have a grounded return path. Only when all input signals to both gates are low, will both NOR gates 1026 and 1028 have high output signals. This condition occurs only when the Space character is sensed. In the circuit shown in FIG. 1 the high output signals would occur upon detection of the Space character between words transmitted in the Murray code. NAND gate 1030 responds to the reception of each Space character whenever both of its input ports are at a logic high. A first output signal indicating reception of the Space character is generated by NAND gate 1030. The input ports of NAND 1030 receive the output signals from NOR gates 1026 and 1028. A pair of high signals at the input ports of NAND gate 1030 produce a low signal at its output port. Because this low signal is not as easily utilized as is a high signal, another NAND gate 1032 is used to invert the output signal from NAND gate 1030 to produce a high signal. The input ports of NAND gate 1032 are connected in parallel and both receive the output signal from NAND gate 1030. Reception of the Space character produces a logical high at the output of NAND gate 1032.

It must, of course, be recognized that the logic of NOR gates 1026 and 1028 and NAND gates 1030 and 1032 is but one of many ways to implement the novel method of detecting a Space character encoded in the Murray code.

Diode 1034 passes only high (positive) output signals from NAND gate 1032.

Variable resistor 1036 is connected at junction 1038 to capacitor 1040. The RC time constant of these two devices determines the number of Space characters that must be detected in a given period of time in order to energize an output device such as a teleprinter. Of course, just one high output signal from NAND gate 1032 could be utilized to turn on an output device. This RC circuit decreases the probability of error by charging capacitor 1040 in response to multiple high output signals from NAND gate 1032 in response to the reception of a plurality of Space characters by the digital autostart circuit.

Resistor 1042 is adjusted to determine the time for capacitor 1040 to discharge. When a group of characters in the Murray code which are separated by Space characters, comes to an end, the output device will stay energized for a time determined by the RC time constant of capacitor 1040 and resistor 1042 and will then be deenergized. Diode 1034 prevents the voltage on capacitor 1040 from discharging into the low output impedance of NAND gate 1032.

The high signal appearing at junction 1038 is inverted twice by NAND gates 1044 and 1046. The first is a high impedance buffer and the second reinverts the low signal at the output of gate 1044 to a high at the output port of NAND gate 1046 for energizing an output device. The input ports of both NAND gates 1044 and 1046 are connected in parallel and therefore operate on the same logic as NAND gates 1030 and 1032. When both input ports of NAND gate 1044 are logical high, the output port of NAND gates 1044, and the input ports of NAND gate 1046 are a logical low. When the input ports of NAND gates 1046 are both logical low, the output port is a logical high. NAND gates 1030, 1032, 1044 and 1046 may be four separate NAND gates in a single device, such as, for example, an RCA device CD 4011.

Relay circuit 1048 may be an electromechanical relay, a solid state switch, or other similar device.

Relay circuit 1048 applies a voltage to terminal 1050 for energizing an output device such as a teleprinter, or a cathode ray terminal (CRT) or a code coversion device.

Turning now to FIG. 2, there is shown a block diagram of a terminal unit which is disclosed in U.s. Pat. No. 4,013,965 except for digital autostart circuit 1000. The specification of U.S. Pat. No. 4,013,965, issued Mar. 22, 1977, to James A. Scharfe, Jr., is hereby incorporated by reference into this specification.

Information characters each comprising the same number of bits, i.e., mark and space pulses are presented to keyer 54 as a sequence of binary pulses as taught in the referenced patent. This sequence of information characters is coupled to digital autostart circuit 1000. When one or more Space characters is detected by the digital autostart circuit, the autostart circuit applies 110 volts AC to energize teleprinter 56. The teleprinter and loop then operate in the manner disclosed in the referenced patent until the digital autostart circuit no longer detects the Space character with sufficient regularity to maintain capacitor 1040 charged at a level which will hold relay 1048 closed. When the digital autostart circuit no longer receives information characters including the predetermined one, the teleprinter is deenergized by removing the 110 volts AC.

Turning now to FIG. 3 there is shown a digital autostart circuit which detects the Space character encoded in the ASCII code commonly used for encoding information processed by digital computers. Information characters, i.e., letters, figures and other characters in the ASCII code, are received in serial form at the input port 1102 of serial to parallel converter 1104. Serial to parallel converter 1104 may be the same type of UAR/T as described above (UAR/T 1104) but connected to process the seven information bits of an ASCII signal rather than five in the Murray code. Clock circuit 1106 is a conventional clock circuit utilized for generating clock pulses at baud rates commonly used for signalling information encoded in the ASCII code. It may be of the same type circuit as discussed above regarding clock circuit 1006. Clock pulses are received by UAR/T 1104 by an input port 1108. A positive voltage is applied to input port 1110 for powering UAR/T 1104.

Digital autostart circuit 1100 is intended to detect the Space character in the ASCII code. The seven information bits at each character of the code received in serial form at input port 1102 are presented in parallel form an output ports 1114, 1116, 1118, 1120, 1122, 1124 and 1126. In the ASCII code the Space character is uniquely defined as a space, space, space, space, space, mark, space signal (SSSSSMS) which in binary terms is a 0000010 signal. Only when the Space character is received by UAR/T 1104 will logic signals comprising 0000010 appear at output ports 1114–1126 respectively.

The sixth information bit of each information character at output port 1124 of UAR/T 1104 is inverted by inverter 1128. Only when a Space character is converted by UAR/T will the signals at output ports 1114, 1116, 1118, 1120, 1122 of UAR/T 1104, at the output port of inverter 1128, and at output port 1126 of UAR/T 1104 be 0000000, respectively.

NOR gate 1130 and 1132 sense the reception of a Space character. They are identical to NOR gates 1026 and 1028 in operation except that NOR gate 1132 has four input ports rather than three. The total of the number of input ports of NOR gates 1130 and 1132 must, of course, at least be equal to the number of information bits at each information character to be sensed by the gates. The logic of NOR gates 1130 and 1132 is the same as the logic for NOR gates 1126 and 1128 when all the input signals present at the input ports of NOR gate are logical low, the signal at the output port will be logical high. Thus the signals at the output ports of both gates 1130 and 1132 will simultaneously be logical highs only when these gates sense the reception of a Space character. The Space character is the only character in the ASCII code that will present logic signals at the input ports of NOR gates 1130 and 1132 all having the same predetermined binary state of 0.

Whenever NOR gates 1130 and 1132 sense a Space character and present a pair of high input signals at the input ports of NAND gate 1134. This gate generates a first output signal for energizing an output device such as the teleprinter, cathode ray terminal or other device. The digital autostart circuit of the invention could be used to energize such devices as a Murray to ASCII code converter.

Digital autostart circuit 1100 generates the first output signal only in response to the reception of the Space character which is received substantially at the same rate at which port 1104 is clocked by clock circuit 1106. In this respect its operation is similar to the digital autostart circuit 1000 shown in FIG. 1 and described above.

The remainder of the circuit element shown in FIG. 2 are identical in function and operation to the corresponding circuit elements in FIG. 1. Inverter 1136 inverts a signal which is a logical low to produce a logical high whenever a Space character is received. Diode 1138, resistor 1140, capacitor 1144 and resistor 1146 correspond to circuit elements 1034, 1036, 1040, and 1042, respectively, in FIG. 1. Inverters 1148 and 1150 correspond to NAND gates 1044 and 1046. Relay circuit 1152 may be identical to relay circuit 1048 as described above.

A second output signal is present at junction 1142 when a plurality of Space characters charge capacitor 1144 as discussed above. Relay circuit 1152 presents 110 volts Ac at output port 1154 so long as sensed Space signals maintain a sufficiently high charge level on capacitor 1144.

The center sampling characteristics of both UAR/Ts 1004 and 1104 in FIGS. 1 and 2, respectively, is utilized to detect Space characters having a baud rate substantially equal to a predetermined baud rate. The respective clock circuits 1006 and 1106 generate clock pulses at the frequency required for the UAR/T to perform serial to parallel conversions at the predetermined baud rate. In performing each conversion the UAR/T samples a portion of each bit of each incoming information character to determine if the bit is a logical high or a logical low. The sampled portion is commonly about 10% of the bit width in duration and taken at or near the center of the bit. If a Space character is received by the UAR/T at a baud rate substantially different from the predetermined baud rate, the UAR/T will sample the lows and highs of the bits but the one high bit of each Space character will not be sampled and presented at the one output port of the UAR/T that drives inverter 1024 and 1128, respectively. Thus, a Space character received at a baud rate substantially different from the predetermined baud rate will not result in logical signals at the inputs of the NOR gates 1026 and 1028 and NOR gates 1130 and 1132, respectively, which all have the same predetermined binary state. This means, of course, that such a Space character will not be sensed by the NOR gates and no first output signal will be generated.

I claim:

1. An autostart circuit for energizing an output device in response to at least one Space character in a series of signals representative of information characters, the information characters including groups of information characters each separated from other such groups by Space characters, each said information character and Space character having the same number of bits and a unique combination of binary states, said autostart circuit comprising:
   a. means for sensing the reception of each Space character; and
   b. means for generating a first output signal in response to at least one sensed Space character for energizing the output device.

2. The circuit as claimed in claim 1 wherein each different information character in said plurality has a unique combination of binary states representing a different alphanumeric and other information character.

3. The circuit as claimed in claim 1 wherein said sensing means comprises means for inverting at least one and the same predetermined bit of each information character received, said sensing means sensing the reception of a Space character wherein the one inverted bit and all the other noninverted bits have the same predetermined binary state.

4. The circuit as claimed in claim 3 wherein said sensing means includes at least one NOR gate and wherein said first generating means includes at least one NAND gate, said inverting means connected to invert at least one predetermined bit in the plurality of bits comprising each character, said NOR gate connected to receive said inverting bit from said inverting means and to receive all noninverted bits in each said character, said NOR gate generating output signals only when all the signals or its inputs have the same binary state, said NAND gate coupled to receive said output signals from said NOR gate, said NAND gate generating a first output signal only in response to the reception of a Space character.

5. The circuit as claimed in claim 1 wherein said plurality of different information characters comprise letters and figures and other characters encoded in a digital code for transmitting information from point to point on the earth.

6. The circuit as claimed in claim 5 wherein said code is the Murray code.

7. The circuit as claimed in claim 5 wherein the middle bit of a Space character uniquely defined as a SSMSS character is inverted to produce a signal SSSSS whenever the Space character is received.

8. The circuit as claimed in claim 5 wherein said code is the ASCII code.

9. The circuit as claimed in claim 5 wherein said plurality of information characters are received in serial sequence.

10. The circuit as claimed in claim 9 further including means for converting the characters in said code from series to parallel form.

11. The circuit as claimed in claim 10 wherein said converting means comprises a universal asynchronous receiver transmitter.

12. The circuit as claimed in claim 1 further including means for generating a second output signal in response to the detection of a plurality of Space characters each separating groups of said information characters, said second generating means coupled to said logic means to receive said first output signals.

13. The circuit as claimed in claim 12 wherein said second output signal is adapted to energize an external apparatus.

14. The circuit as claimed in claim 12 wherein said second generating means comprises a resistor and capacitor, said resistor connected to receive said first output signals and said second output signal being generated at the junction of said resistor and said capacitor.

15. The circuit as claimed in claim 14 further including a second resistor connected in parallel with said capacitor to adjust the discharge time of said capacitor thereby defining said predetermined time interval for maintaining said second output signal.

16. The circuit as claimed in claim 15 further including means for buffering said second output signal.

17. The circuit as claimed in claim 12 wherein said second generating means is adapted to maintain said second output signal only in response to reception of two consecutive Space characters within a predetermined time interval.

18. The circuit as claimed in claim 17 wherein a first output signal is generated in response to the reception of an information character which is received in inverted form and sensed as a Space character within the predetermined time interval for maintaining said output signal and wherein said second generating means does not respond to the inverted reception of such a character.

19. The circuit as claimed in claim 1 wherein said circuit is adapted to detect only Space characters received substantially at a predetermined rate of reception.

20. The circuit as claimed in claim 19 wherein all the bits of each received information character are sampled to determine their binary states substantially simultaneously for only a portion of the time duration of each bit, wherein the predetermined rate of reception controls the rate at which information characters are sampled and wherein said sensing means only senses the reception of Space characters received substantially at the predetermined rate.

21. The circuit as claimed in claim 20 wherein the binary states of the bits of each information character are transformed from series to parallel form by a converter and are sampled by said converter.

22. The circuit as claimed in claim 21 wherein said predetermined rate of reception is selectable.

23. The circuit as claimed in claim 21 wherein said series to parallel converter is a universal asynchronous receiver transmitter.

24. The circuit as claimed in claim 19 wherein said predetermined rate of reception is substantially 45.45, 50.00, 56.88, 74.2 or 75.0 baud for information characters encoded in the Murray code.

25. A method for energizing an output device in response to at least one Space character in a series of signals which are representative of a plurality of information characters including Space characters separating groups of information characters in said plurality comprising:
   a. sensing the reception of each Space character:
   b. generating a first output signal in response to each Space character sensed for energizing the output device.

26. The method as claimed in claim 25 wherein the signals representing each information character have the same number of bits but the bits of each different information character in said plurality have a unique combination of binary states.

27. The method as claimed in claim 26 wherein said step of sensing the reception of each Space character includes inverting at least one predetermined bit of each information character received, wherein logic signals representing the one inverted bit and the noninverted bit have the same predetermined binary state, and a first output signal being generated only in response to said logic signals all having the same predetermined binary state to indicate the detection of a Space character.

28. The method as claimed in claim 26 wherein said pluarlity of different information characters comprise letters and figures and other characters encoded in a commonly known digital code for transmitting information from point to point on the earth.

29. The method as claimed in claim 28 wherein said code is the Murray code.

30. The method as claimed in claim 28 wherein the middle bit of a Space character uniquely defined as a SSMSS character is inverted to produce logical signals SSSSS whenever a Space character is received.

31. The method as claimed in claim 28 wherein said code is the ASCII code.

32. The method as claimed in claim 28 wherein said information characters are received in serial form and further including the initial step of converting said information characters from serial to parallel form.

33. The method as claimed in claim 26 further including the additional step of generating a second output signal in response to the detection of a plurality of Space characters separating groups of said plurality of information characters.

34. The method as claimed in claim 33 wherein said second output signal is adapted to energize the output device.

35. The method as claimed in claim 33 wherein said step of generating a second output signal is continued only in response to the reception of two consecutive Space characters within a predetermined time interval.

36. The method as claimed in claim 35 wherein a first output signal is generated in response to the reception of one information character which is received in inverted form and which is sensed as a Space character within the predetermined time interval for continuing said second output signal and wherein no second output signal is generated in response to such an inverted information character.

37. The method as claimed in claim 33 wherein the step of generating a second output signal is followed by the step of buffering said second output signal for driving a plurality of logic devices.

38. The method as claimed in claim 26 wherein the step of sensing the reception of each Space character comprises sensing only each Space character received substantially at a predetermined rate of reception.

39. The method as claimed in claim 38 wherein said predetermined rate of reception is substantially 45.45, 50.00, 56.88, 74.2 or 75.0 baud for information characters encoded in the Murray code.

40. The method as claimed in claim 38 wherein said sensing step includes sampling all the bits of each received information character to determine their binary states substantially simultaneously for only a portion of the time duration of each bit, wherein the predetermined rate of reception controls the rate at which information characters are sampled and wherein said step means only senses the reception of Space characters received substantially at the predetermined rate.

41. The method as claimed in claim 26 wherein the step of generating first output signal is followed by the step of automatically energizing an electrical apparatus in response to said first output signal.

42. The method as claimed in claim 26 wherein the information characters are received in serial form and wherein said method is preceded by two steps, the step of storing each received character in a memory followed by the step of releasing each said stored character from the memory.

43. The method as claimed in claim 42 wherein each said stored character is stored for a period of time sufficiently long for a teleprinter to start.

44. In a terminal unit for converting a plurality of digital information characters from audio signals received from a radio receiver to digital pulses which are transmitted to an output device for presentation of said information characters in human understandable form, each said information character having the same number of bits but different predetermined binary states, said terminal unit including an autostart circuit for automatically energizing the output device in response to the reception of said information characters and for deenergizing the output device upon the conclusion of a message, the improvement comprising a circuit for detecting Space characters which includes:
   a. means for inverting one of the bits of each said information characters to produce logic signals equal in number to said number of bits;
   b. means for sensing when said logic signals all have the same predetermined binary state; and
   c. means for generating a first output signal only in response to said logic signals all having the same predetermined binary state to indicate the detection of the Space information character, said first output signal coupled to said autostart circuit for energizing the output device.

* * * * *